2,768,198

NOVEL ESTER OF BIXINS WITH HIGHER ALCOHOLS AND PROCESS FOR THE MANUFACTURE THEREOF

Roman Marbet and Alfred Winterstein, Riehen, Switzerland, assignors to Hoffmann-La Roche Inc., Nutley, N. J., a corporation of New Jersey No Drawing. Application December 17, 1953, Serial No. 398,884

Claims priority, application Switzerland December 18, 1952

4 Claims. (Cl. 260—485)

The present invention concerns novel esters of bixins with higher alcohols and a process for the manufacture thereof. The said esters of bixins with higher alcohols may be used as coloring agents for fats.

The methyl and ethyl esters of bixin are known substances, which may be obtained by reacting bixins with dimethyl sulfate or diethyl sulfate or with diazomethane. The latter esters are however not suitable as coloring agents for fats, because, like bixin itself, they are only slightly soluble in fats and oils, and in solvents for the latter, such as petroleum ether. The solubility of the propyl and butyl esters of bixin, which are novel compounds, is not substantially better than that of the methyl and ethyl esters.

It has now been found that the esters of bixins with higher alcohols, i. e. alcohols which contain at least 5 carbon atoms in the molecule, possess an unexpectedly high solubility in fats, oils and fat solvents. Thus, for example, amyl-bixin is 10 times, octyl-bixin even more than 20 times more soluble in the said solvents than butyl-bixin. Especially valuable as fat coloring agents are the bixin esters with vitamin A, since beside the excellent fat solubility thereof, they give to the foodstuffs colored therewith an especially pleasant and stable color. The invention is not limited to one form of the bixin esters, but comprises esters with the several bixins, i. e. with cis-bixin, cis-nor-bixin, all-trans-bixin and all-trans-nor-bixin.

The manufacture of the said esters of bixins with higher alcohols cannot be effected according to the known procedure used for esterifying bixins with lower alcohols. Even the preparation of the bixin esters over the intermediate acid chloride is not in all cases feasible, inasmuch as reacting bixins with phosphorus pentachloride or with thionyl chloride will lead only to a substantial extent to the formation of degradation products.

The invention now provides an operative procedure for the preparation of the said esters, which comprises reacting the bixins with oxalyl chloride, whereupon the acid chloride of the bixins formed is treated with the higher alcohols, with which the bixins are to be esterified.

Example 1

5 parts by weight of cis-bixin in 150 parts by volume of anhydrous benzene and 5 parts by volume of oxalyl chloride are refluxed for 1 hour. The solution is evaporated in vacuo to dryness and the residue is dissolved in 150 parts by volume of benzene. The solution is added with 20 parts by volume of amyl alcohol and allowed to stand at room temperature for 3 hours. The solution is then heated shortly to boiling, cooled down to room temperature, whereupon 300 parts by volume of ether are added. The solution is washed twice in a separating funnel with 300 parts by volume of a 1 percent sodium hydrogen carbonate solution, dried with anhydrous sodium sulfate and filtrated through an aluminum oxide column. After rinsing with ether, the combined filtrates are concentrated in vacuo to 50 parts by volume, 100 parts by volume of ethanol are added, at slightly reduced pressure, again evaporated to approx. 50 parts by volume. On standing in the cold, cis-bixin amylester crystallizes from this solution in the form of granular crystals. By recrystallizing the same from ethanol, the new ester is obtained in pure form. Melting point 149° C.

Example 2

5 parts by weight of cis-bixin are converted into the acid chloride by treatment with 5 parts by volume of oxalyl chloride in 150 parts by volume of benzene, as described in Example 1, and then esterified with 20 parts by volume of n-hexanol. 5.5 parts by weight of pure cis-bixin hexylester, which melts at 129° C., are obtained.

Example 3

5 parts by weight of cis-bixin in 150 parts by volume of anhydrous benzene and 5 parts by volume of oxalyl chloride are refluxed for 1 hour. The dark red solution is evaporated in vacuo to dryness and the residue is dissolved in 150 parts by volume of benzene. To the solution are added, while cooling, 5 parts by weight of n-octanol dissolved in 100 parts by volume of benzene and 6 parts by weight of pyridine, and the mixture is allowed to stand at room temperature for 3 hours. The solution is then heated to boiling for a short time, cooled down to room temperature, whereupon 300 parts by volume of ether are added thereto. The solution is washed twice in a separating funnel with 300 parts by volume of 0.5 N sulfuric acid each, then twice with 300 parts by volume of a 1 percent sodium hydrogen carbonate solution, dried with sodium sulfate and chromatographed on an aluminum oxide column. Cis-bixin having not reacted as well as decomposition products are kept back in the top zone of the column, while the excess octanol runs through the column together with the new ester formed. The aluminum oxide column is washed with ether and the combined solutions are concentrated in vacuo to 50 parts by volume. To the solution are added 100 parts by volume of ethanol and the mixture is evaporated anew at slightly reduced pressure to approx. 50 parts by volume. On standing in the cold, cis-bixin-octylester crystallizes in beautiful flakes. By recrystallizing from ethanol, the new ester is obtained in pure form. Melting point 111° C.

Example 4

As described in Example 3, 5 parts by weight of cis-bixin are converted into the acid chloride by treatment with 5 parts by volume of oxalyl chloride in 150 parts by volume of benzene and then esterified with 5 parts by weight of n-decanol. Upon working up the reaction mixture in accordance with the procedure described in Example 1, cis-bixin-decylester in the form of fine platelets is obtained. Melting point 84° C.

Example 5

5 parts by weight of cis-bixin are converted with 5 parts by volume of oxalyl chloride into the acid chloride, as described in Example 3, and the latter is esterified with 5 parts by weight of n-hexadecanol. 4.5 parts by weight of pure cis-bixin-hexadecyl, which melts at 75° C., are obtained.

Example 6

5 parts by weight of cis-bixin are converted into the acid chloride with 5 parts by volume of oxalyl chloride, as described in Example 3, and then esterified with 5 parts by weight of n-octadecanol. Cis-bixin-n-octadecyl ester is obtained in the form of fine platelets, which melt at 89° C.

*Example 7*

5 parts by weight of cis-bixin are converted into the acid chloride with 5 parts by volume of oxalyl chloride, as described in Example 3, and then esterified with 5 parts by weight of cholesterol. 3.5 parts by weight of cis-bixin-cholesterolester of melting point 113–115° C. are obtained.

*Example 8*

5 parts by weight of cis-bixin are converted into the acid chloride with 5 parts by volume of oxalyl chloride, as described in Example 3, and then esterified with 5 parts by weight of geraniol. 4.5 parts by weight of cis-bixin-geramylester are obtained in the form of beautiful large platelets, melting at 109–110° C.

*Example 9*

5 parts by weight of all-trans-bixin in 200 parts by volume of anhydrous benzene are refluxed with 5 parts by volume of oxalyl chloride for 1 hour. The solution is then evaporated to dryness in vacuo and the violet residue is redissolved in 200 parts by volume of anhydrous benzene. To the solution are added, while cooling, 5 parts by weight of n-octanol dissolved in 100 parts by volume of benzene and 6 parts by volume of pyridine. After standing overnight, the solution is heated to boiling for a short time, cooled down, whereupon 300 parts by volume of ether are added. The solution is washed with dilute sulfuric acid and sodium hydrogen carbonate solution, and dried over anhydrous sodium sulfate. The solution is filtrated through an aluminum oxide column, the latter is rinsed with ether and the filtrate is evaporated in vacuo to 100 parts by volume. To the solution are added 200 parts by volume of ethanol, whereupon it is concentrated to 100 parts by volume. On standing in the cold, the new ester crystallizes in the form of a brown-red powder. By recrystallizing twice from alcohol, pure all-trans-bixin-octylester of melting point 122° C. is obtained.

*Example 10*

5 parts by weight of all-trans-bixin are converted into the acid chloride with 5 parts by volume of oxalyl chloride, as described in Example 9, and reacted with 5 parts by volume of n-octadecanal. 7 parts by weight of all-trans-bixin-n-octadecyl ester of melting point 110° C. are thus obtained.

*Example 11*

5 parts by weight of all-trans-bixin are converted into the acid chloride with 5 parts by volume of oxalyl chloride, as described in Example 9, and esterified with 5 parts by weight of phytol. 4 parts by weight of all-trans-bixin-phytylester of melting point 122° C. are thus obtained.

*Example 12*

5 parts by weight of cis-nor-bixin in 400 parts by volume of anhydrous benzene are refluxed with 10 parts by volume of pyridine and 20 parts by volume of oxalyl chloride for 30 minutes. The solution is thereafter evaporated to dryness in vacuo and the residue is dissolved in 150 parts by volume of benzene. To the solution is added, while cooling, a solution of 10 parts by volume of n-octanol in 100 parts by volume of benzene and 11 parts by volume of pyridine. After standing overnight at room temperature, the solution is heated to boiling for a short time, whereupon ether is added, as described in Example 1; the mixture is washed with dilute sulfuric acid and sodium hydrogen carbonate solution, dried over sodium sulfate and filtrated through an aluminum oxide column. The filtrate is evaporated in vacuo to 50 parts by volume, added with 400 parts by volume of ethanol and evaporated under slightly reduced pressure to 100 parts by volume. On standing in the cold the dioctylester of cis-nor-bixin crystallizes. By recrystallizing the same from alcohol, it is obtained in a pure state; melting point 73° C.

*Example 13*

5 parts by weight of all-trans-nor-bixin in 400 parts by volume of anhydrous chloroform and 10 parts by volume of pyridine are refluxed with 20 parts by volume of oxalyl chloride for 30 minutes. The solution is evaporated to dryness in vacuo and the residue is dissolved in 150 parts by volume of benzene. The solution is added, while cooling, with a solution of 10 parts by weight of n-octadacanol in 100 parts by volume of benzene and 11 parts by volume of pyridine. When working up the solution as described in Example 12, 4.2 parts by weight of dioctadecylester of all-trans-nor-bixin are obtained. After having been recrystallized twice from alcohol, the compound melts at 110° C.

*Example 14*

40 parts by weight of all-trans-bixin in 1000 parts by volume of anhydrous benzene are refluxed with 40 parts by volume of oxalylchloride for 1 hour. Then the benzene and the excess oxalyl chloride are evaporated in vacuo. The remaining violet colored residue is dissolved in 1000 parts by volume of benzene, added while cooling with a solution of 40 parts by weight of vitamin A in 1000 parts by volume of benzene and 60 parts by volume of pyridine. After standing for 3 hours, the solution is heated to boiling for a short time and cooled down to room temperature. 2000 parts by volume of ether are added and the dark red colored solution is washed twice with 3000 parts by volume each of 0.5 N. sulfuric acid. The washed solution is dried with sodium sulfate and chromatographed on an aluminum oxide column. Small quantities of non-reacted all-trans-bixin are retained in the top zone of the aluminum oxide column, while the excess vitamin A appears first in the eluate. The aluminum oxide column is washed with ether and the combined dark red colored filtrates are concentrated in vacuo to 500 parts by volume. 1000 parts by volume of ethanol are added whereupon the mixture is concentrated again to 500 parts by volume. Already during the evaporating procedure, the new ester crystallizes. On standing in the cold, the crystallization is completed. The yield of crude ester is 60 parts by weight (90 percent). By recrystallizing from petroleum ether, the vitamin A ester of all-trans-bixin is obtained in the form of fine dark red rosettes, melting at 140° C. When dissolved in carbon disulfide, the ester shows in a grating spectroscope absorption at 527, 492, 457 m$\mu$. The spectrophotometrical evaluation reveals the characteristical absorption band for vitamin A at 326 m$\mu$.

*Example 15*

50 parts by weight of cis-bixin in 1500 parts by volume of benzene are refluxed with 50 parts by volume of oxalyl chloride for 1 hour. Then benzene and excess oxalyl chloride are evaporated in vacuo. The residue is dissolved in 1500 parts by volume of benzene and, while cooling, a solution of 50 parts by weight of vitamin A in 500 parts by volume of benzene and 75 parts by volume of pyridine are added. The solution is kept at rest overnight, heated to boiling for a short time and cooled to room temperature. 2000 parts by volume of ether are then added and the dark red colored solution is washed twice with 3000 parts by volume each of 0.5 N sulfuric acid. The washed solution is dried with sodium sulfate and chromatographed on an aluminum oxide column. Small quantities of non-reacted bixin are retained in the top zone of the column, while excess vitamin A first appears in the filtrate. The aluminum oxide column is washed with ether and the combined red filtrates are concentrated in vacuo to 200 parts by volume. 200 parts by volume of ether are added and the mixture is poured, while stirring, into 3000 parts by volume of low boiling petroleum ether. The mixture is maintained at −10° C., so that the oily precipitate may solidify. The mother liquors are concentrated to 700 parts by volume and allowed to stand overnight at low temperature, thus permitting a second fraction of the vitamin A ester to precipitate. The yield of crude ester is 70 parts by weight (85 percent). By recrystallizing the same from petroleum ether, the vitamin A ester of cis-bixin is obtained in the form of lustrous, brown-red platelets, melting at 124° C. When dissolved in carbon disulfide, the ester shows in a grating spectroscope absorption at 521, 487, 456 m$\mu$. The spectrophotometrical evaluation reveals the characteristical absorption band for vitamin A at 326 m$\mu$.

*Example 16*

4 parts by weight of all-trans-nor-bixin in 100 parts by volume of anhydrous chloroform are refluxed with 8 parts by volume of pyridine and 16 parts by volume of oxalyl chloride for 30 minutes. Then, the chloroform and the excess oxalyl chloride are evaporated in vacuo. The remaining violet colored residue is dissolved in 100 parts by volume of benzene and added, while cooling, with a solution of 8 parts by weight of vitamin A in 100 parts by volume of benzene and 6 parts by volume of pyridine. After 3 hours' standing, the solution is heated to boiling for a short time and allowed to cool down to room temperature. 200 parts by volume of ether are added and the dark red colored solution is washed twice with 300 parts by volume each of 0.5 N sulfuric acid. The washed solution is dried with sodium sulfate and chromatographed on an aluminum oxide column. Small quantities of non-reacted all-trans-nor-bixin are retained in the top zone of the column, while the excess vitamin A runs through. The column is washed with ether and the combined dark red colored filtrates are concentrated in vacuo to 50 parts by volume. To the solution are added 100 parts by volume of ethanol and the mixture is concentrated anew to 50 parts by volume. Already during the evaporation procedure, the new ester crystallizes. On allowing to stand in the cold, crystallization is soon completed. The yield of crude ester amounts to approx. 6 parts by weight (63 percent). By recrystallizing from benzene-alcohol, the vitamin A diester of all-trans-nor-bixin is obtained as a violet powder, melting at 168° C. When dissolved in carbon disulfide, the ester shows in a grating spectroscope an absorption maximum at 527 m$\mu$.

*Example 17*

5 parts by weight of cis-nor-bixin in 150 parts by volume of chloroform are refluxed with 20 parts by volume of oxalyl chloride and 10 parts by volume of pyridine. The chloroform and the excess oxalyl chloride are then evaporated in vacuo. The residue is dissolved in 150 parts by volume of benzene and, while cooling, a solution of 10 parts by weight of vitamin A in 50 parts by volume of benzene and 7.5 parts by volume of pyridine are added thereto. The solution is allowed to stand overnight, then it is heated to boiling for a short time and cooled to room temperature. 200 parts by volume of ether are added and the dark red colored solution is washed twice with 300 parts by volume each of 0.5 N sulfuric acid and twice with 300 parts by volume each of a 1 per cent aqueous sodium hydrogen carbonate solution. The washed solution is dried with sodium sulfate and chromatographed on an aluminum oxide column. Small amounts of side products as well as non-reacted nor-bixin are retained in the top zone of the column, while the excess vitamin A runs through. The aluminum oxide column is washed with ether and the combined red filtrates are evaporated in vacuo to dryness. A reddish violet wax-like residue is thus obtained, which may be crushed to a powder. The yield of crude vitamin A-diester of cis-nor-bixin thus formed amounts to 7 parts by weight (60 percent). When dissolved in carbon disulfide, the ester shows in a grating spectroscope a characteristical absorption maximum at 521 m$\mu$.

We claim:

1. An ester wherein the acid moiety is that of an acid selected from the group consisting of bixin and norbixin and the alcohol moiety is that of an alcohol selected from the group consisting of monohydric acyclic alcohols containing at least five carbon atoms and monohydric alicyclic alcohols containing at least five carbon atoms.

2. A process of preparing an ester according to claim 1 which comprises reacting an acid selected from the group consisting of bixin and norbixin with oxalyl chloride, and then reacting the acid chloride formed with an alcohol selected from the group consisting of monohydric acyclic alcohols containing at least five carbon atoms and monohydric alicyclic alcohols containing at least five carbon atoms.

3. An ester wherein the acid moiety is that of cis-bixin and the alcohol moiety is that of vitamin A.

4. An ester wherein the acid moiety is that of all-trans-nor-bixin and the alcohol moiety is that of vitamin A.

References Cited in the file of this patent

Hassett Chem. Abs. 3 (1909) 2706.
Adams et al.: J. Am. Chem. Soc. 42 (1920), 599–611.
Karrer et al.: Chem. Abs. 23 (1929), 4480.
Van Duuren Chem. Abs. 33 (1939), 5080.
Karrer, "Organic Chemistry" (1950) 4th ed., page 713.

Disclaimer 2,768,198.—*Roman Marbet* and *Alfred Winterstein*, Riehen, Switzerland. NOVEL ESTER OF BIXINS WITH HIGHER ALCOHOLS AND PROCESS FOR THE MANUFACTURE THEREOF. Patent dated Oct. 23, 1956. Disclaimer filed Apr. 3, 1957, by the assignee, *Hoffmann-La Roche Inc.*
Hereby enters this disclaimer to claim 1 of said patent.
[*Official Gazette April 30, 1957.*]